(12) United States Patent
Herrig et al.

(10) Patent No.: US 10,400,744 B2
(45) Date of Patent: Sep. 3, 2019

(54) WIND TURBINE BLADE WITH NOISE REDUCING MICRO BOUNDARY LAYER ENERGIZERS

(71) Applicant: General Electric Company, Schenectady, NY (US)

(72) Inventors: Andreas Herrig, Garching bei München (DE); Saskia Gerarda Honhoff, Garching bei München (DE); Stefan Herr, Greenville, SC (US); Jonathan Luedke, Greenville, SC (US); Kevin Kinzie, Greenville, SC (US)

(73) Assignee: General Electric Company, Schenectady, NY (US)

( * ) Notice: Subject to any disclaimer, the term of this patent is extended or adjusted under 35 U.S.C. 154(b) by 469 days.

(21) Appl. No.: 15/141,228

(22) Filed: Apr. 28, 2016

(65) Prior Publication Data

US 2017/0314530 A1 Nov. 2, 2017

(51) Int. Cl.
*F03D 1/06* (2006.01)

(52) U.S. Cl.
CPC ........ *F03D 1/0641* (2013.01); *F05B 2240/32* (2013.01); *F05B 2250/60* (2013.01); *F05B 2260/96* (2013.01); *Y02E 10/721* (2013.01)

(58) Field of Classification Search
CPC .... F03D 1/0641; F03D 1/0633; F03D 1/0675; F03D 1/0683; F03D 7/022; F03D 7/0296;
(Continued)

(56) References Cited

U.S. PATENT DOCUMENTS

| 5,169,290 A | * | 12/1992 | Chou | ...................... F01D 5/145 |
| | | | | 416/223 B |
| 5,734,990 A | * | 4/1998 | Waring | .................... A41D 7/00 |
| | | | | 2/10 |

(Continued)

FOREIGN PATENT DOCUMENTS

| EP | 1192355 B1 | 4/2002 |
| EP | 1662137 A1 | 5/2006 |

(Continued)

OTHER PUBLICATIONS

Johnson, Scott J., Van Dam, C.P. "Case", Berg, and Dale E., Active Load Control Techniques for Wind Turbines, Sandia National Laboratories, SAND2008-4809, Aug. 2008, 132 pgs.

(Continued)

*Primary Examiner* — Richard A Edgar
*Assistant Examiner* — Topaz L. Elliott
(74) *Attorney, Agent, or Firm* — Mary Louise Stanford

(57) ABSTRACT

A wind turbine blade assembly includes a rotor blade having exterior surfaces defining a pressure side, a suction side, a leading edge and a trailing edge, each extending between a blade tip and a root. The rotor blade additionally defining a span and a chord. The blade assembly further includes a plurality of micro boundary layer energizers positioned on a surface of the pressure side of the rotor blade. The plurality of micro boundary layer energizers extending one of above or below a neutral plane of the rotor blade. The micro boundary layer energizers are shaped and positioned chord-wise to delay separation of a boundary layer at a low angle of attack. A wind turbine including the blade assembly is additionally disclosed.

19 Claims, 8 Drawing Sheets

(58) Field of Classification Search
CPC .............. F05B 2260/96; F05B 2240/32; F05B 2240/305; F05B 2240/31
USPC ................ 416/235, 236 R, 236 A, 237, 238; 244/204, 204.1, 200.1
See application file for complete search history.

(56) References Cited

U.S. PATENT DOCUMENTS

| | | | |
|---|---|---|---|
| 7,604,461 B2 * | 10/2009 | Bonnet | F03D 1/0641 416/235 |
| 7,901,189 B2 | 3/2011 | Gupta et al. | |
| 7,909,575 B2 | 3/2011 | Barbu et al. | |
| 7,914,259 B2 | 3/2011 | Godsk | |
| 7,976,276 B2 | 7/2011 | Riddell et al. | |
| 7,976,283 B2 | 7/2011 | Huck | |
| 8,013,460 B2 | 9/2011 | Rinzie et al. | |
| 8,044,670 B2 | 10/2011 | Bjerge et al. | |
| 8,047,801 B2 | 11/2011 | Fang et al. | |
| 8,061,986 B2 | 11/2011 | Xiong | |
| 8,157,532 B2 | 4/2012 | Matesanz Gil et al. | |
| 8,182,231 B2 | 5/2012 | Corten | |
| 8,192,161 B2 * | 6/2012 | Baker | F03D 1/0641 416/23 |
| 8,197,218 B2 | 6/2012 | Tangler et al. | |
| 8,267,657 B2 | 9/2012 | Huck et al. | |
| 8,287,228 B2 | 10/2012 | Kinzie et al. | |
| 8,382,043 B1 | 2/2013 | Raghu | |
| 8,414,261 B2 | 4/2013 | Bonnet | |
| 8,426,994 B2 | 4/2013 | Nielsen et al. | |
| 8,430,638 B2 | 4/2013 | Drobietz et al. | |
| 8,460,779 B2 | 6/2013 | Gupta et al. | |
| 8,523,515 B2 | 9/2013 | Drobietz et al. | |
| 8,532,828 B2 | 9/2013 | Schramm et al. | |
| 8,602,739 B2 * | 12/2013 | Enevoldsen | F03D 1/0641 416/223 R |
| 8,656,957 B2 | 2/2014 | Babinsky et al. | |
| 8,878,377 B2 | 11/2014 | Oilgaard et al. | |
| 9,039,381 B2 | 5/2015 | Grife et al. | |
| 2010/0266382 A1 | 10/2010 | Campe et al. | |
| 2011/0006165 A1 | 1/2011 | Ireland | |
| 2011/0123330 A1 | 5/2011 | Matesanz Gil | |
| 2011/0142595 A1 | 6/2011 | Santiago et al. | |
| 2011/0229321 A1 * | 9/2011 | Kilaras | F03B 3/121 416/1 |
| 2011/0268558 A1 | 11/2011 | Driver et al. | |
| 2013/0140818 A1 | 6/2013 | Matesanz Gil | |
| 2013/0209220 A1 | 8/2013 | Nielsen | |
| 2013/0266441 A1 | 10/2013 | Enevoldsen | |
| 2013/0280066 A1 | 10/2013 | Scholte-Wassink et al. | |
| 2014/0093382 A1 | 4/2014 | Fugisang | |
| 2014/0142888 A1 | 5/2014 | Duncan et al. | |
| 2014/0219795 A1 | 8/2014 | Honhoff et al. | |
| 2014/0227101 A1 | 8/2014 | Yao | |
| 2014/0286784 A1 | 9/2014 | Singh | |
| 2014/0294592 A1 | 10/2014 | Drack et al. | |
| 2014/0328688 A1 * | 11/2014 | Wilson | F01D 5/02 416/223 R |
| 2014/0377065 A1 | 12/2014 | Matesanz | |
| 2015/0064003 A1 | 3/2015 | Drobietz | |
| 2015/0121994 A1 | 5/2015 | Wilhelm | |
| 2015/0132130 A1 | 5/2015 | Brown | |
| 2015/0139810 A1 | 5/2015 | Kinzie | |
| 2015/0159493 A1 * | 6/2015 | Corten | F03D 1/0633 416/223 R |
| 2015/0252778 A1 | 9/2015 | Altmikus et al. | |
| 2015/0292522 A1 | 10/2015 | Singh et al. | |
| 2015/0308408 A1 | 10/2015 | Eriksen et al. | |
| 2015/0316032 A1 | 11/2015 | Drack et al. | |
| 2015/0361951 A1 * | 12/2015 | Zamora Rodriguez | F03D 1/0633 416/236 R |
| 2017/0284362 A1 * | 10/2017 | Enevoldsen | F03D 13/10 |

FOREIGN PATENT DOCUMENTS

| | | |
|---|---|---|
| EP | 1775464 A2 | 4/2007 |
| EP | 2131037 A2 | 12/2009 |
| EP | 2420625 A2 | 2/2012 |
| EP | 2439403 A1 | 11/2012 |
| EP | 2631467 A1 | 8/2013 |
| EP | 2543876 A2 | 9/2013 |
| EP | 2636889 A1 | 9/2013 |
| EP | 2716906 A2 | 4/2014 |
| EP | 2824320 A1 | 1/2015 |
| EP | 2851553 A1 | 3/2015 |
| EP | 2851554 A1 | 3/2015 |
| EP | 2851556 A1 | 3/2015 |
| EP | 1613860 B1 | 4/2015 |
| JP | 2010216308 A | 9/2010 |
| JP | 2010216309 A | 9/2010 |
| JP | 2013209969 A | 10/2013 |
| JP | 2014227977 A | 12/2014 |
| WO | 016482 A1 | 3/2001 |
| WO | 2010061255 A2 | 6/2010 |
| WO | 2012071679 A1 | 6/2012 |
| WO | 2014044412 A1 | 3/2014 |
| WO | 2014048437 A1 | 4/2014 |
| WO | 2014048581 A1 | 4/2014 |
| WO | 2014207015 A1 | 12/2014 |
| WO | 2015003718 A1 | 1/2015 |
| WO | 2015024601 A1 | 2/2015 |
| WO | 2015121044 A1 | 8/2015 |
| WO | 2015167604 A1 | 11/2015 |
| WO | 2015169471 A1 | 11/2015 |
| WO | 2015192915 A1 | 12/2015 |
| WO | 2015193654 A1 | 12/2015 |
| WO | 2015195327 A1 | 12/2015 |

OTHER PUBLICATIONS

Moller, Henrik and Pedersen, Christian Sejer, Low-Frequency Noise from Large Wind Turbines, J. Acoust. Soc. Am. 129 (6), Jun. 2011, VC 2011 Acoustical Society of America, pp. 3727-3744.

* cited by examiner

WIND TURBINE BLADE WITH NOISE REDUCING MICRO BOUNDARY LAYER ENERGIZERS

BACKGROUND

The disclosure relates generally to the field of wind turbines, and more particularly to turbine blades having an aerodynamic vortex element on the flow surfaces thereof.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades are the primary elements of wind turbines for converting wind energy into electrical energy. The rotor blades capture kinetic energy from wind using known airfoil principles. The rotor blades in general have the cross-sectional profile of an airfoil such that, during operation, air flows over the blade producing a pressure difference between the sides. Consequently, a lift force, which is directed from a pressure side towards a suction side, acts on the blade. The lift force transmits the kinetic energy through rotational energy by generating torque on the main rotor shaft, which is geared to a generator. The generator converts the mechanical energy to electrical energy that may be deployed to a utility grid.

As wind energy systems gain more and more importance as a source of energy in recent years, areas suitable for their economical operation have become relatively scarce in a number of countries. Thus, a growing number of wind energy systems are located close to populated areas. Some known wind turbine blades may generate considerable noise during operation of the wind turbine. As a consequence, local authorities having the responsibility for granting permission for installing wind turbines may refuse to allow installation due to the noise.

Methods for reducing the noise emissions of wind energy systems have long been discussed. In some instances, the aerodynamic characteristics of the rotor blades have been changed by adding dimples, protrusions, or other structures on the surface of the blade. These structures are sometimes referred to as "vortex generators." These devices improve the aerodynamic performance of a blade by inducing mixing of the boundary layer with the outer flow or by mixing inside the boundary layer so as to make the profile "fuller", thereby delaying boundary layer separation, while increasing lift and reducing drag and noise at higher angles of attack. In many instances, vortex generators (VGs) are placed on the suction side of an airfoil/wind turbine rotor blade to delay the onset of this boundary layer separation. However, these types of prior art noise reducers have a variety of disadvantages, and may not adequately reduce the noise associated with typical rotor blades.

Thus, a rotor blade with improved noise-reducing features would be desired.

BRIEF DESCRIPTION

These and other shortcomings of the prior art are addressed by the present disclosure, which includes a wind turbine blade with noise reducing micro boundary layer energizers Briefly, one aspect of the present disclosure resides in a wind turbine blade assembly. The wind turbine blade assembly including a rotor blade and a plurality of micro boundary layer energizers. The rotor blade having exterior surfaces defining a pressure side, a suction side, a leading edge and a trailing edge, each extending between a blade tip and a blade root. The rotor blade further defining a span and a chord. The plurality of micro boundary layer energizers are positioned on a surface of the pressure side of the rotor blade. The plurality of micro boundary layer energizers extend one of above or below a neutral plane of the rotor blade. The micro boundary layer energizers are shaped and positioned chordwise to delay separation of a boundary layer on the pressure side at a low angle of attack.

Another aspect of the disclosure resides in a wind turbine comprising a plurality of rotor blade assemblies. At least one of the rotor blade assemblies including a suction side surface and a pressure side surface, and defining a span and a chord and a plurality of micro boundary layer energizers formed on the pressure side surface. The plurality of micro boundary layer energizers extending one of above or below a neutral plane of the rotor blade in an operational position of the plurality of micro boundary layer energizers. The plurality of micro boundary layer energizers are shaped and positioned to add longitudinal vortices into a boundary layer to increase vertical momentum exchange in the boundary layer and delay separation of the boundary layer at a low angle of attack.

Yet another aspect of the disclosure resides in a wind turbine. The wind turbine including a tower, a hub and at least one rotor blade assembly rotatably connected to the hub. The at least one rotor blade assembly rotatable in response to wind impinging upon the at least one rotor blade assembly. The rotor blade assembly comprising a rotor blade and a plurality of micro boundary layer energizers. The rotor blade having exterior surfaces defining a pressure side, a suction side, a leading edge and a trailing edge, each extending between a blade tip and a root. The rotor blade defining a span and a chord. The plurality of micro boundary layer energizers are positioned on a surface of the pressure side of the rotor blade. The plurality of micro boundary layer energizers extending one of above or below a neutral plane of the rotor blade. The micro boundary layer energizers are shaped and positioned chordwise to delay separation of a boundary layer at a low angle of attack.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying, wherein.

Figure 13:
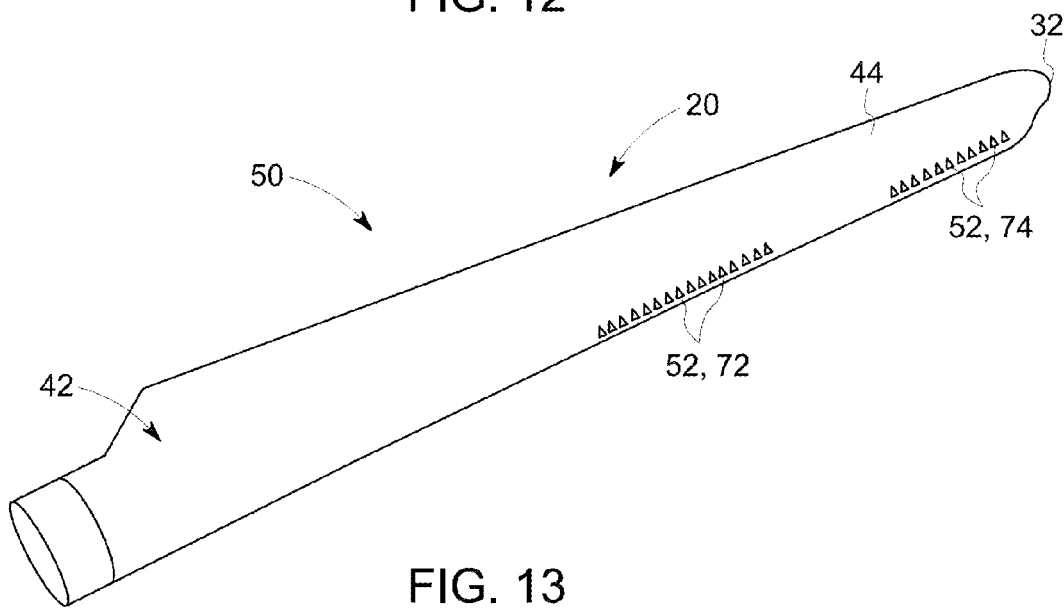
Figure 14:
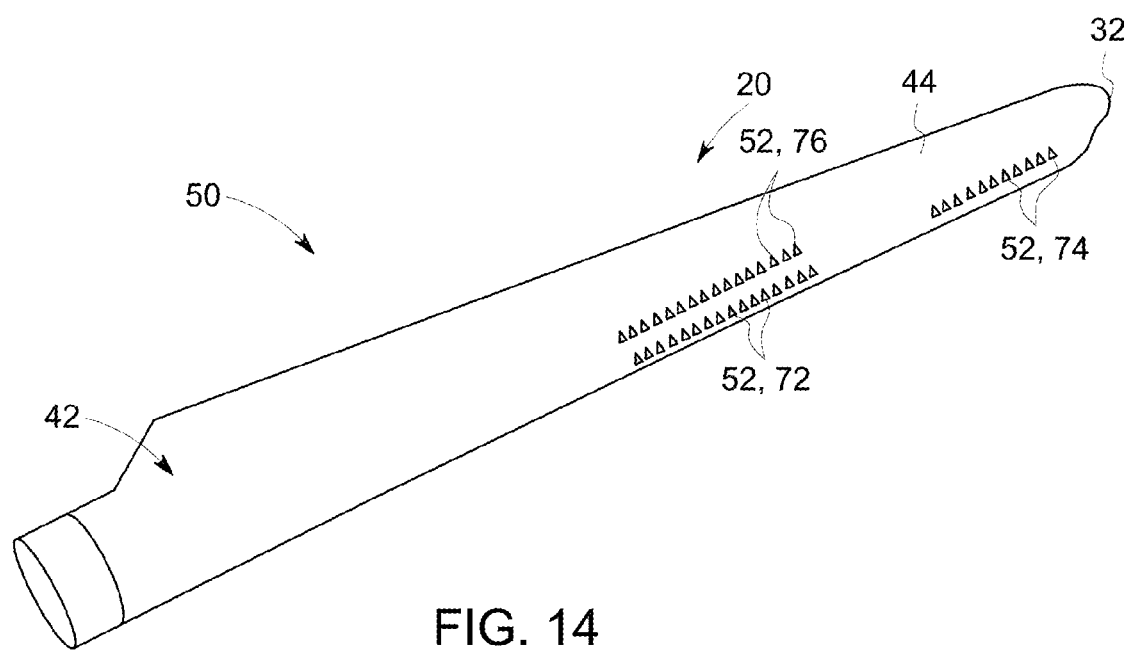

FIG. 13 is a perspective view of another embodiment of a wind turbine blade including a plurality of micro boundary layer energizers in accordance with one or more embodiments shown or described herein; and FIG. 14 is a perspective view of yet another embodiment of a wind turbine blade including a plurality of micro boundary layer energizers in accordance with one or more embodiments shown or described herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In addition, as used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power. As used herein, the term "blade" is intended to be representative of any device that provides reactive force when in motion relative to a surrounding fluid. In addition, the term "blade" is intended to encompass an element having the cross-sectional profile of an airfoil such that, during operation, air flows over the blade producing a pressure difference between the sides. As used herein, the term "edge" is intended to be representative of a side formed by the intersection of two things (e.g., sides, surfaces, etc.). An "edge," as used herein, may include a curved surface. As used herein, the term "leading edge" is intended to be representative of a side formed by the intersection of a pressure side and a suction side of a blade that first comes into contact with a fluid, such as air. As used herein, the term "trailing edge" is intended to be representative of a side formed by the intersection of a pressure side and a suction side of a blade downstream of the leading edge and is the last edge contacted by the fluid.

Although generally described herein with respect to a wind turbine blade, the systems and methods described herein are applicable to any type of airfoil, for example, blades used in aero engines, fan blades, aircraft wings, and/or other airfoils that generate self-noise, such as trailing edge noise.

Figure 1:
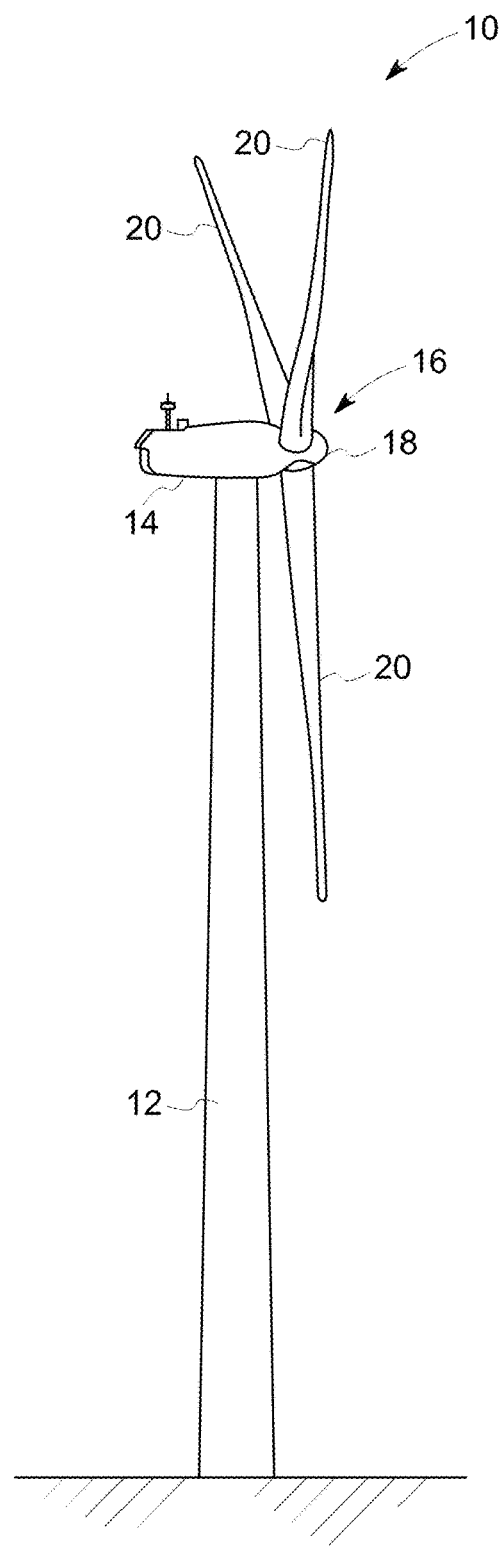
FIG. 1 is a perspective view of an embodiment of a wind turbine, in accordance with one or more embodiments shown or described herein.

Referring now to the drawings, FIG. 1 illustrates a side view of one embodiment of a wind turbine 10 including a plurality of micro boundary layer energizers, in accordance with one or more embodiments shown or described herein. As shown, the wind turbine 10 generally includes a tower 12, a nacelle 14 mounted on the tower 12, and a rotor 16 coupled to the nacelle 14. The wind turbine power generation and control components are housed within the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 having the cross-sectional profile of an airfoil such that, during operation, air flows over the rotor blade 20 producing a pressure difference between the sides of the rotor blade 20. The rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced. The view of FIG. 1 is provided for illustrative purposes only to place the present invention in an exemplary field of use. It should be appreciated that the invention is not limited to any particular type of wind turbine configuration.

Figure 2:
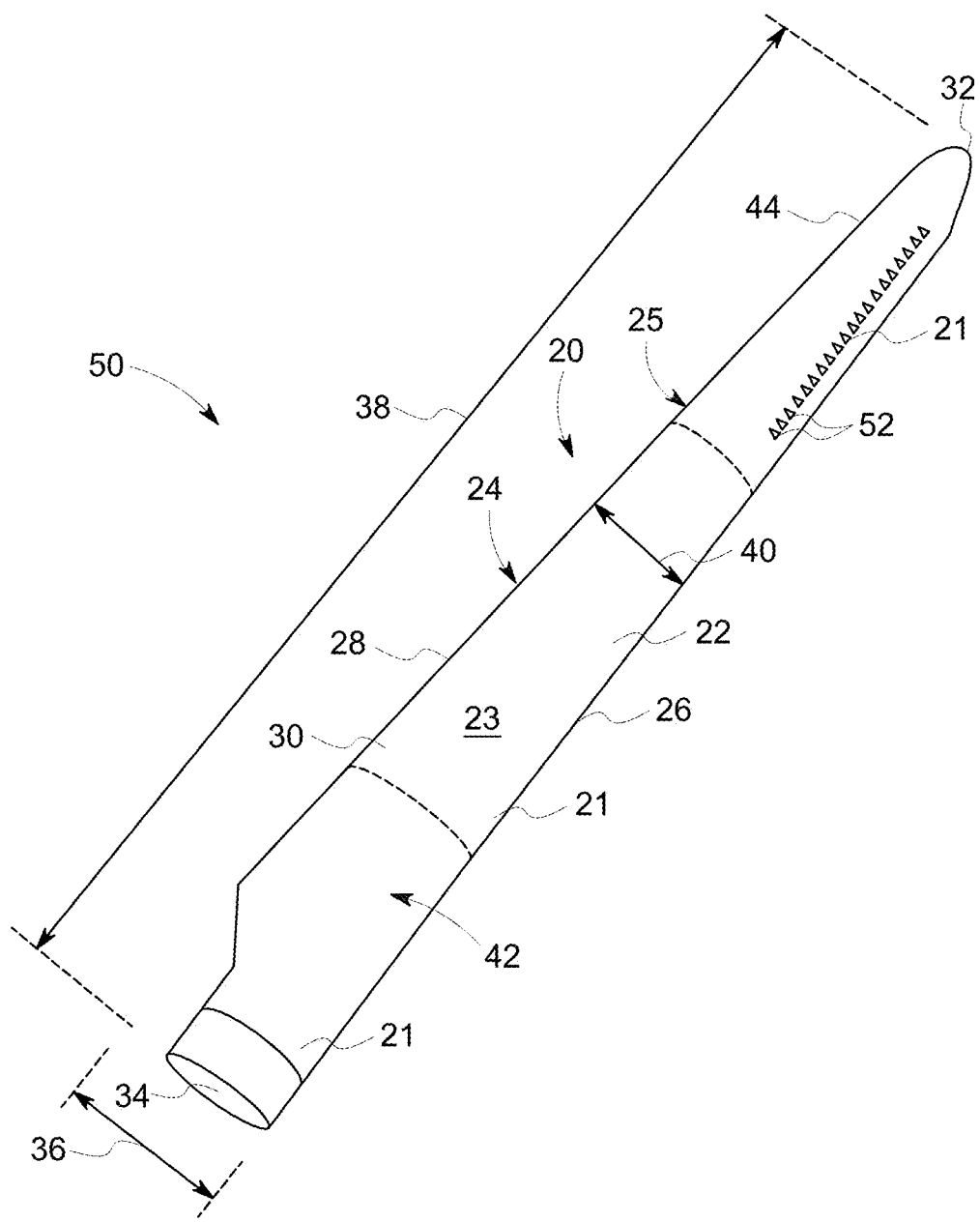
FIG. 2 is a perspective view of an embodiment of a wind turbine blade including a plurality of micro boundary layer energizers, in accordance with one or more embodiments shown or described herein.

Referring to FIG. 2, the rotor blade 20 according to the present disclosure is typically formed from a shell which may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 20 may include a plurality of individual blade segments 21 aligned in an end-to-end order from the blade tip 32 to the blade root 34. Each of the individual blade segments 21 may be uniquely configured so that the plurality of blade segments 21 define the complete rotor blade 20 having a designed aerodynamic profile, length, and other desired characteristics. For example, each of the blade segments 21 may have an aerodynamic profile that corresponds to the aerodynamic profile of adjacent blade segments 21. Thus, the aerodynamic profiles of the blade segments 21 may form a continuous aerodynamic profile of the rotor blade 20. Alternatively, the rotor blade 20 may be formed as a singular, unitary blade having the designed aerodynamic profile, length, and other desired characteristics.

The rotor blade 20 may, in exemplary embodiments, be curved. Curving of the rotor blade 20 may entail bending the rotor blade 20 in a generally flapwise direction and/or in a generally edgewise direction. The flapwise direction may generally be construed as the direction (or the opposite direction) in which the aerodynamic lift acts on the rotor blade 20. The edgewise direction is generally perpendicular to the flapwise direction. Flapwise curvature of the rotor blade 20 is also known as pre-bend, while edgewise curvature is also known as sweep. Thus, a curved rotor blade 20 may be pre-bent and/or swept. Curving may enable the rotor blade 20 to better withstand flapwise and edgewise loads during operation of the wind turbine 10, and may further provide clearance for the rotor blade 20 from the tower 12 during operation of the wind turbine 10.

The rotor blade 20 may further define a chord 36 and a span 38. As shown in FIG. 2, the chord 36 may vary throughout the span 38 of the rotor blade 20. Thus, a local chord 40 may be defined for the rotor blade 20 at any point on the rotor blade 20 along the span 38.

Additionally, the rotor blade 20 may define an inboard area 42 and an outboard area 44. The inboard area 42 may be a span-wise portion of the rotor blade 20 extending from the root 34. For example, the inboard area 42 may, in some embodiments, include approximately 33%, 40%, 50%, 60%, 67%, or any percentage or range of percentages therebetween, or any other suitable percentage or range of percentages, of the span 38 from the blade root 34. The outboard area 44 may be a span-wise portion of the rotor blade 20 extending from the blade tip 32, and may in some embodiments include the remaining portion of the rotor blade 20 between the inboard area 42 and the blade tip 32. Additionally or alternatively, the outboard area 44 may, in some embodiments, include approximately 33%, 40%, 50%, 60%, 67%, or any percentage or range of percentages therebetween, or any other suitable percentage or range of percentages, of the span 38 from the blade tip 32.

Figure 3:
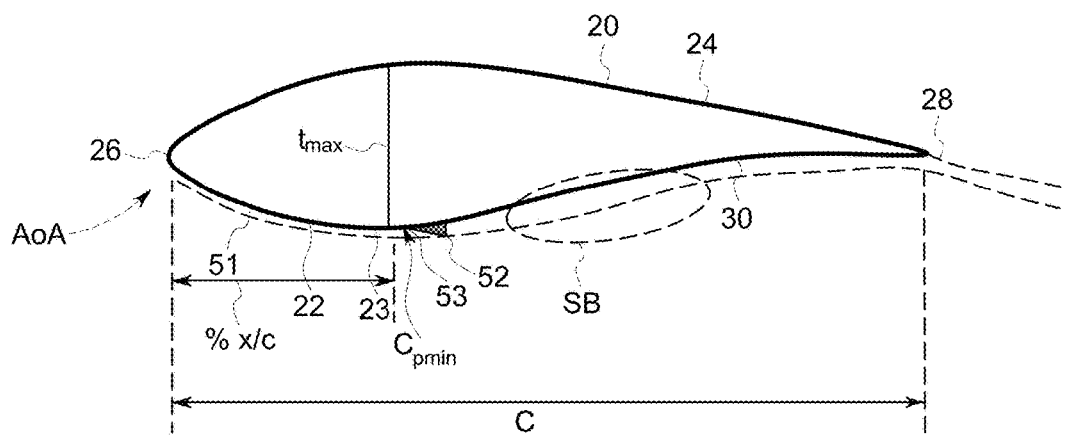
FIG. 3 is a side diagrammatic view of an embodiment of a wind turbine blade including a plurality of micro boundary layer energizers, in accordance with one or more embodiments shown or described herein.
Figure 4:
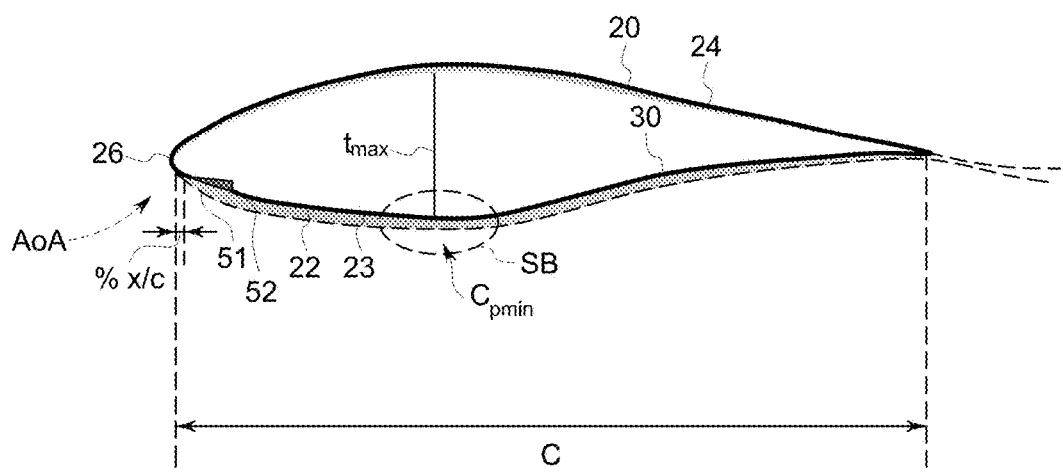
FIG. 4 is a side diagrammatic view of another embodiment of a wind turbine blade including a plurality of micro boundary layer energizers, in accordance with one or more embodiments shown or described herein

As illustrated in FIG. 2, the present disclosure is directed to one or more rotor blade assemblies. A rotor blade assembly 50 according to the present disclosure includes the rotor blade 20 and a plurality of micro boundary layer energizers 52 formed on the pressure side 22 of the rotor blade 20 so as to extend above or below a neutral plane corresponding to an outer profile of the pressure side surface (described presently) of the rotor blade 20. In an embodiment, the plurality of micro boundary layer energizers 52 may be mounted to a surface of the rotor blade 20. The micro boundary layer energizers 52 are shaped and positioned chordwise to delay boundary layer separation at low angles of attack (AoA) and may advantageously reduce the aerodynamic noise being emitted from the rotor blade 20 during operation of the wind turbine 10 and/or increase the efficiency of the rotor blade 20. As used herein, a low angle of attack is intended to encompass any angle at which an airflow hits the chord line of a rotor blade and at which: (i) the turbulent BL has begun to thicken on the pressure side resulting in an increase in noise; (ii) the BL has commenced separation on the pressure side; or (iii) at a blade pitch angle above approximately 7 degrees. Low AoAs include negative AoAs. FIGS. 2 through 4 depict various embodiments of wind turbine blades 20 incorporating aspects of the disclosure.

Referring still to FIG. 2, the rotor blade 20 includes a pressure side surface 23 and a suction side surface 25 defined between the leading edge 26 and the trailing edge 28. In an embodiment, the plurality of micro boundary layer energizers 52 are formed in the outboard area 44 of the pressure side surface 23 in a desired pattern. As previously alluded to, the pressure side surface 23 on which the micro boundary layer energizers 52 are formed is described herein as having a "neutral" plane that corresponds to the substantially smooth outer profile of the blade 20 defined between the blade tip 32 and the blade root 34 and between the leading edge 26 and the trailing edge 28. The plurality of micro boundary layer energizers 52 are described in an operational position as extending above or below the neutral plane of the pressure side surface 23. In an embodiment, a spar cap (not shown) and associated webs (not shown) may be provided internally of the blade 20. In the embodiment illustrated in FIG. 2, the micro boundary layer energizers 52 are depicted on the pressure side 22 and each configured as a generally wedge-shaped element (described presently).

One or more specific embodiments of the present disclosure will be described below. In an effort to provide a concise description of these embodiments, not all features of an actual implementation are described in the specification. Referring more specifically to FIGS. 3 and 4, illustrated are various embodiments of a plurality of micro boundary layer energizers 52 in relation to a wind turbine blade, such as rotor blade 20 of FIG. 2. For the sake of simplicity, the configuration of the plurality of micro boundary layer energizers 52 relative to the rotor blade 20 are shown in a chord-wise schematic side view in each of FIGS. 3 and 4. In addition, it again is noted that identical reference numerals denote the same elements throughout the various views.

Referring particularly to FIGS. 3 and 4, a rotor blade 20 in accordance with aspects of the disclosure includes of a plurality of micro boundary layer energizers 52 positioned inboard of the blade tip 32 in a direction of air flow over the blade surface. The micro boundary layer energizers 52 are shaped and positioned chordwise to delay separation of a boundary layer 51 at low angles of attack (described presently) and may advantageously reduce the aerodynamic noise being emitted from the rotor blade 20 during operation of the wind turbine 10 and/or increase the efficiency of the rotor blade 20. For example, the plurality of micro boundary layer energizers 52 may be disposed a distance downstream from the leading edge 26 of the rotor blade 20, as best illustrated in FIG. 3, or alternatively disposed closer to the leading edge 26 of the rotor blade 20, as best illustrated in FIG. 4. As previously indicated, positioning of the plurality of micro boundary layer energizers 52 on the pressure side 22 of the rotor blade 20 is provided for low AoAs, as illustrated by the dashed line. The dashed lines in FIGS. 3 and 4 indicate air flow over the leading edge 26 of the blade 20 towards the trailing edge 28. Flow separation occurs at a chord length, as previously described, between the leading edge 26 and the trailing edge 28.

The plurality of micro boundary layer energizers 52 are configured to extend above or below the neutral plane 30 of the rotor blade 20. Referring more specifically to FIG. 3, as illustrated, in a preferred embodiment, the plurality of micro boundary layer energizers 52 are positioned so as to extend above the neutral plane 30 relative to the pressure side surface 23. The plurality of micro boundary layer energizers 52 are further positioned so that an upstream most point, or edge, 53 of each of the plurality of micro boundary layer energizers 52 is positioned downstream of the maximum thickness "$t_{max}$" of the pressure side 22. More particularly, as described herein, x/c is the ratio of the distance of the micro boundary layer energizers 52 from the leading edge 26 along the chord axis "x" (connecting the leading edge 26 and the trailing edge 28) to the total chord length "c", or local chord 40. In an embodiment, for a typical airfoil, with t/c>19-22%, where t/c is the ratio of the thickness "t" of the blade to the chord length "c", the upstream most point 53 of each of the plurality of micro boundary layer energizers 52 is positioned between ~20-55% x/c. The downstream end of the range is the location where the turbulent separation (bubble), as indicated by the dashed line SB, starts to form on the blade 20 with a decreasing lift coefficient "$C_L$" and chordwise growth of the boundary layer thickness. This increase in the thickness of the boundary layer 51 when moving downstream may result in the use of larger micro boundary layer energizers 52, resulting in an increase in drag at normal AoAs. In terms of pressure coefficient (Cp) distribution, the micro boundary layer energizers 52 are positioned downstream of the minimum Cp ($C_P$-min). In a preferred embodiment, the plurality of micro boundary layer energizers 52 are positioned downstream of the minimum pressure point location $C_P$-min on the pressure side 22 so as to have minimal impact on the minimum lift coefficient ($C_L$-min) and to minimize an increase in drag at normal angles of attack.

In an alternate embodiment, such as illustrated in FIG. 4, where the plurality of micro boundary layer energizers 52 are positioned upstream of the Cp minimum location, the potential higher loads due to more negative lift would need to be balanced with the noise reduction benefit and cover a shorter blade region near the blade tip 32. As illustrated, in this particular embodiment, the plurality of micro boundary layer energizers 52 are positioned so as to extend below the neutral plane 30 relative to the pressure side surface 23. In extending below the neutral plane 30, the plurality of micro boundary layer energizers 52 may be configured similar to the ramps extending above the neutral plane 30, and more particularly as V-shaped grooves, Wheeler-type vortex generators, dents, dimples, or the like formed in the outer surface of the blade 20. In this embodiment, leading edge stall is addressed such as in blades having a lower pressure side camber (typically thinner, <~18%) and a strongly negative angle of attack. In the illustrated configuration of FIG. 4, the additional drag at normal operation conditions will be limited by positioning the plurality of micro boundary layer energizers 52 into a stagnation region on the blade 20, where the flow velocity is very low.

As previously stated, in an embodiment the plurality of micro boundary layer energizers 52 are described as static and fixed relative to the rotor blade pressure side surface 23 at an operational position extending above or below the neutral plane 30 of the rotor blade 20. In an alternate embodiment, the plurality of micro boundary layer energizers 52 may be configured recessed into the pressure side 22 of the blade 20 relative to the neutral plane 30 and configured for actuation from a retracted position to an operational position, protruding or extending above the neutral plane of the pressure side surface 23 in which they are formed. In this instance, the plurality of micro boundary layer energizers 52 are described as dynamic. The micro boundary layer energizers 52 may be actuated by any suitable means, including electronic means, pneumatic means, hydraulic means, shape memory alloys (SMAs), and so forth. Additional aspects of dynamic vortex generators, similar to the dynamic micro boundary layer energizers described herein, are further described in U.S. Patent Pub. No. 2011/0142595, entitled, "Wind Turbine Blades with Aerodynamic Vortex Elements", filed by the same assignee, and incorporated herein by this reference.

The micro boundary layer energizers 52 may have different shape configurations within the scope and spirit of the disclosure. As previously alluded to, each of the micro boundary layer energizers 52, positioned on the pressure side 22 (FIG. 2) is configured having any geometric shape capable of providing a delay in boundary layer separation at a low angle of attack, such as, but not limited to, a fin-shape, wing-shape, wedge-shape and any other shape determined to be suitable for modifying the aerodynamic characteristics of the blade so as to delay the boundary layer separation at low angles of attack.

Figure 5:
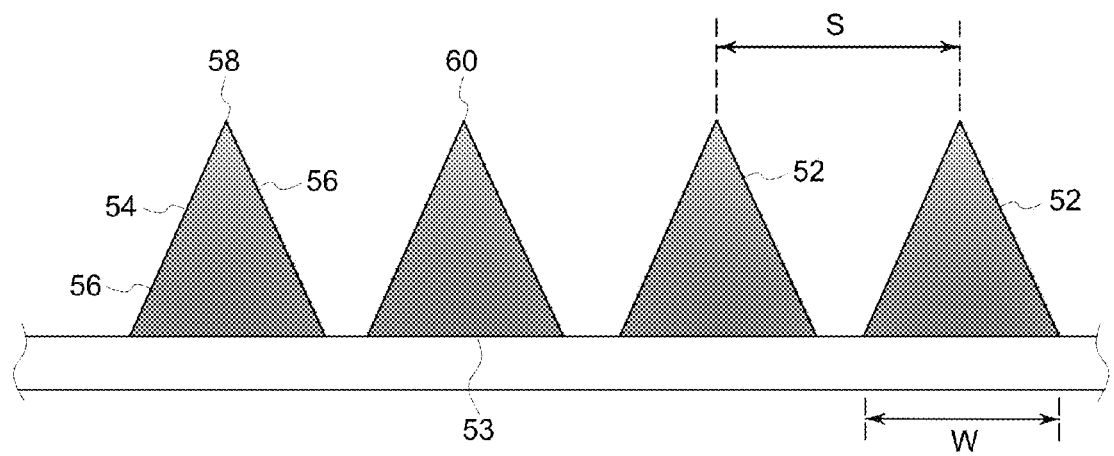
FIG. 5 is a top diagrammatic view of a portion of the plurality of micro boundary layer energizers, in accordance with one or more embodiments shown or described herein.
Figure 6:
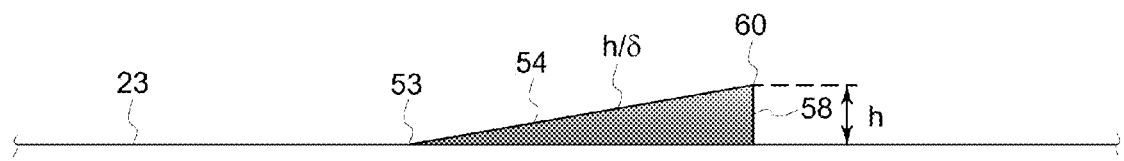
FIG. 6 is a side diagrammatic view of a single micro boundary layer energizer, in accordance with one or more embodiments shown or described herein.

Referring now to FIGS. 5 and 6, in general, the micro boundary layer energizers 52 are illustrated as generally wedge-shaped elements, each having an upwardly inclined wind face 54, a plurality of side faces 56, a downwardly inclined slip joint 58 defined by the meeting of the wind face 54 and the plurality of side faces 56, with the wind face 54 and the slip joint 58 meeting downstream at an apex 60. The wind face 54 and the side faces 56 may have various shapes and configurations. For example, in the embodiment of FIGS. 5 and 6, the wind face 54 and the side faces 56 are formed by generally flat inclined wall segments arranged to form a generally wedge-shaped element. These walls are inclined at a relatively constant angle from the pressure side surface 23 toward the apex 60.

A spanwise spacing of the individual micro boundary layer energizers 52 is selected such that a good compromise between cumulative device drag and beneficial effect on boundary layer separation reduction is found. In an embodiment, the plurality of micro boundary layer energizers 52 are spaced in a spanwise direction, having a spacing "S" in a range of approximately 8-20 times, the height "h" of the micro boundary layer energizers 52. In a specific embodiment, the plurality of micro boundary layer energizers 52 are spaced in a spanwise direction, having a spacing "S" of approximately 10 times the height "h" of the micro boundary layer energizers 52. In the illustrated embodiment, the spanwise spacing "S" is indicated between the downstream-most portions of the wedge-shaped elements, and more particularly, between the apexes 60 of adjacent micro boundary layer energizers 52. In an embodiment, the spacing "S" may be scaled, based on a thickness of the boundary layer, whereby the spacing and thickness may become equivalent at some point.

Referring in particular to FIG. 6, the height "h" of each of the micro boundary layer energizers 52 may range from approximately 1-15 mm. The wind face 54, as illustrated, is ramped, having a ratio of the height "h" to the length "L" of the micro boundary layer energizers 52 between 1:5 to 1:20. To minimize possible negative impacts of device drag of the plurality of micro boundary layer energizers 52, the height of each of the micro boundary layer energizers 52 should be as low as possible. It was found that wedge ramps having a ratio of h/δ (delta), wherein "h" is the height at the apex 60 and δ is equal to a thickness of the boundary layer, determined at the AoA/condition when the turbulent separation bubble SB (FIGS. 3 and 4) has begun to form, between 0.2 and 0.7 provided such, but designs having a greater height may be possible. There exist some variation possible around this value, with a loss of effectiveness defining the lower end and excess drag (and at some point excess noise) at the upper end of the range.

Figure 7:
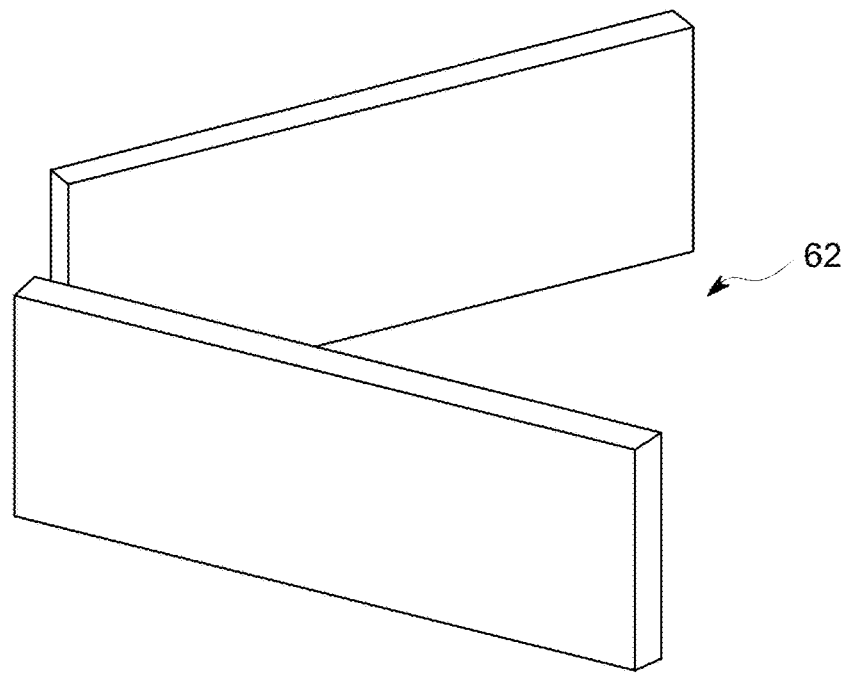
FIG. 7 is a simplified perspective view of an alternate embodiment of a single micro boundary layer energizer, in accordance with one or more embodiments shown or described herein.
Figure 8:
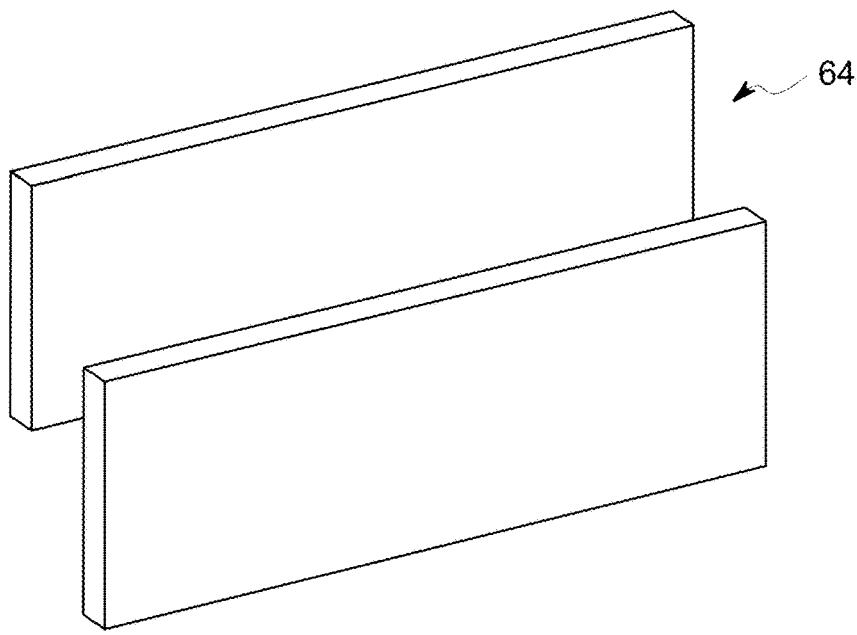
FIG. 8 is a simplified perspective view of an alternate embodiment of a single micro boundary layer energizer, in accordance with one or more embodiments shown or described herein.
Figure 9:
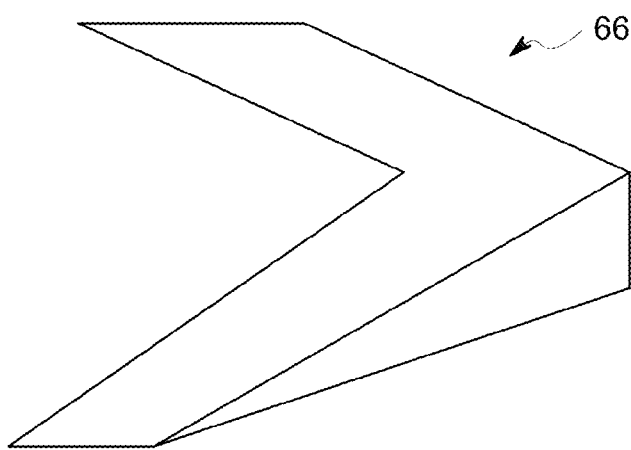
FIG. 9 is a simplified perspective view of an alternate embodiment of a single micro boundary layer energizer, in accordance with one or more embodiments shown or described herein.
Figure 10:
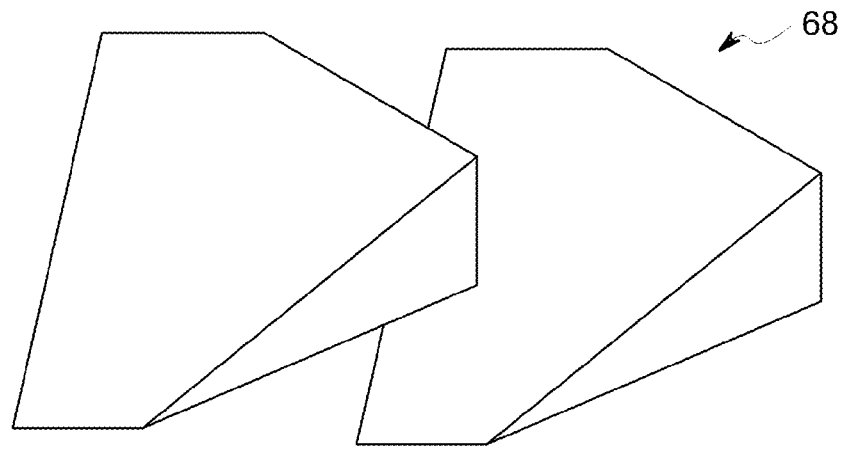
FIG. 10 is a simplified perspective view of an alternate embodiment of a single micro boundary layer energizer, in accordance with one or more embodiments shown or described herein.
Figure 11:
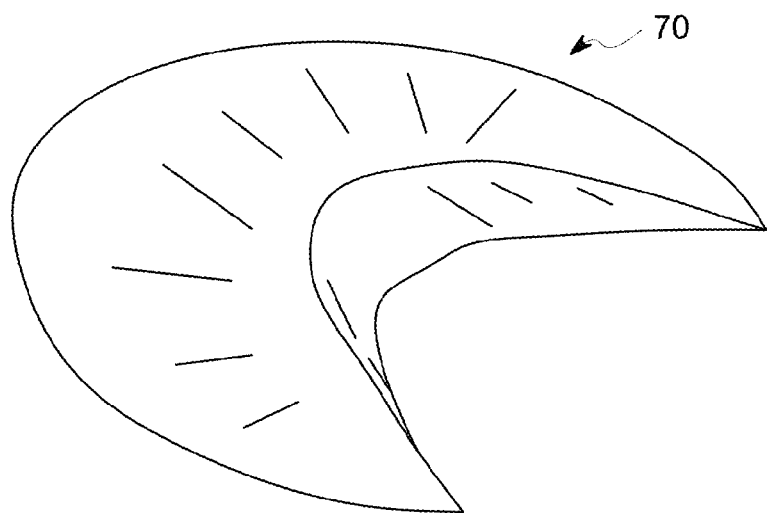
FIG. 11 is a simplified perspective view of an alternate embodiment of a single micro boundary layer energizer, in accordance with one or more embodiments shown or described herein.

As best illustrated in FIGS. 7-10, the plurality of micro boundary layer energizers 52, as disclosed herein, may include different shape configurations, and more particularly, having any geometric shape capable of providing a delay in boundary layer separation at a low angle of attack. Referring more specifically to FIGS. 7 and 8, illustrated are alternate shape configurations of the plurality of micro-boundary layer energizers 52 generally configured as vane-type energizers, well known in the art. More specifically, the of micro-boundary layer energizers may be configured as counter-rotating micro boundary layer energizers 62 comprised of a plurality of vane-type components, as best illustrated in FIG. 7. Alternatively, the plurality of micro-boundary layer energizers may be configured as co-rotating micro boundary layer energizers 64 comprised of a plurality of vane-type components, as best illustrated in FIG. 8. Additionally, FIGS. 9-11 illustrate further alternate shape configurations of the plurality of micro-boundary layer energizers 52, generally configured as wheeler-type energizers, well known in the art. More specifically, the of micro-boundary layer energizers may be configured as wishbone-shaped micro boundary layer energizers 66, as best illustrated in FIG. 9. Alternatively, the plurality of micro-boundary layer energizers may be configured as doublet-shaped micro boundary layer energizers 68, as best illustrated in FIG. 10, or as U-shaped micro boundary layer energizers 70 including an open-ended U-shaped ridge that defines side horns, as best illustrated in FIG. 11, and as further described in U.S. Pat. No. 8,047,801, entitled, "Wind Turbine Blades with Aerodynamic Vortex Elements", filed by the same assignee, and incorporated herein by this reference.

Figure 12:
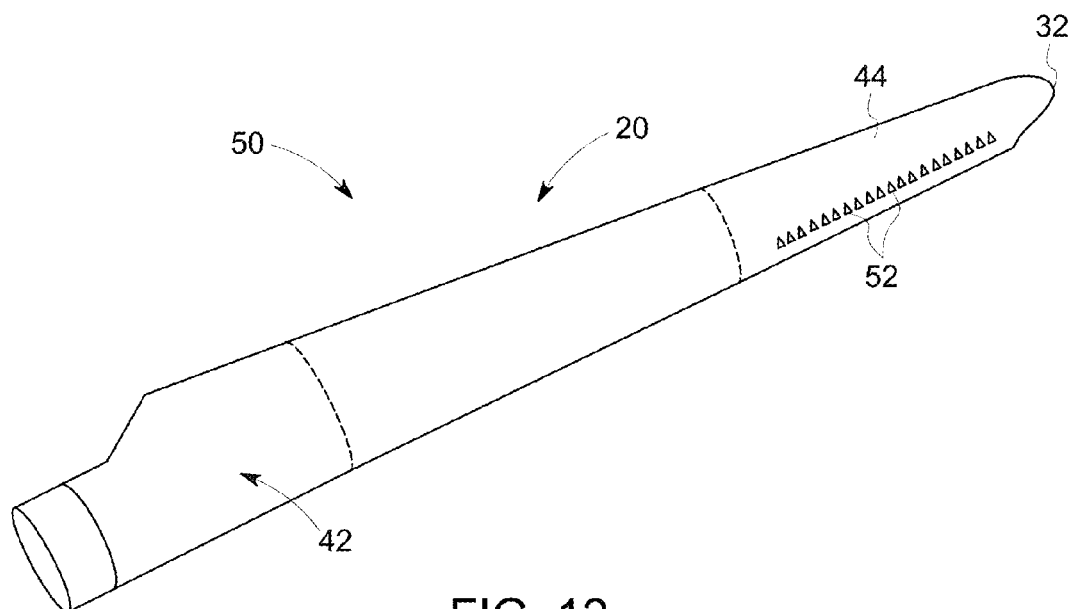
FIG. 12 is a perspective view of an embodiment of a wind turbine blade including a plurality of micro boundary layer energizers, in accordance with one or more embodiments shown or described herein.

Referring now to FIG. 12, as previously stated, the plurality of micro boundary layer energizers 52 may be positioned in the outboard area 44 of the rotor blade 20. More specifically, in an embodiment, the plurality of micro boundary layer energizers 52 are positioned in the outboard area 44 on the pressure side 22 of the rotor blade 20 between 0%-50% of a spanwise dimension measured from the blade tip 32, as the contribution to the overall noise levels from the inboard area 42 of the rotor blade 20 has been found to be minor. Alternatively, as best illustrated in FIG. 13, there may be additional pluralities of micro boundary layer energizers having a gap in the installation line. More specifically, in an embodiment, the rotor blade assembly 50, and more particularly the plurality of micro boundary layer energizers 52 may include a first plurality 72 of micro boundary layer energizers 52 positioned approximately mid-span, and extending into the outboard area 44 of the blade 20 to address an early separation bubble SB formation typically found on thick airfoils. The rotor blade assembly 50, and more particularly the plurality of micro boundary layer energizers 52 may further include, a second plurality 74 of micro boundary layer energizers 52 positioned in the outboard area 44 to address extra noise that may be present from lower AoAs during strongly pitched operation. In yet another alternate embodiment illustrated in FIG. 14, additional pluralities of micro boundary layer energizers 52 are anticipated for inclusion, such as, but not limited to, a second row 76 of micro boundary layer energizers 52 (in chordwise direction) positioned where the chords are large and the streamwise lifetime of the vortices may be too short to cover the whole low wall shear range.

The plurality of micro boundary layer energizers as disclosed herein, provide for the addition of longitudinal vortices into the boundary layer, downstream of the energizers, thus providing an increase in the vertical momentum exchange in the boundary layer. As an effect, the susceptibility to boundary layer separation is delayed in that the lower region close to the pressure side surface receives an increase in momentum. The boundary layer remains attached at angles-of-attack where it would otherwise separate. The plurality of micro boundary layer energizers effectively suppress non-open separation (bubbles). In addition, the thickness of a very loaded boundary layer may be reduced, resulting in a beneficial effect on trailing edge noise production.

Proper chordwise placement of the plurality of micro boundary layer energizers is necessary, and more particularly, positioning upstream of the separation location of the boundary layer in the noisy operating region of the blade, but in a region which is covered by separation before the AoA of peak $C_L$.

The proposed plurality of micro boundary layer energizers may be used as a retrofit means for blades that exhibit low AoA noise increase or designed into a new blade.

Micro-vortex generators have been utilized to impact boundary layers when applied on the suction side of a rotor blade with an increase in $C_L$-max. High AoAs occur in an operating range where the goal is to capture as much power as possible within constraints (such as noise and loads). Low AoAs occur in rated power operations, where the turbine keeps power constant so performance is not relevant (the turbine would just adjust the pitch). Accordingly, as disclosed herein, the inclusion of a plurality of micro boundary layer energizers positioned on a pressure side of a rotor blade has been found beneficial to impact the boundary layer on the pressure side at low AoAs, by delaying the formation of a thick boundary layer, flow separation bubbles and flow separation, and reducing noise while minimizing the change of $C_L$.

It is to be understood that not necessarily all such objects or advantages described above may be achieved in accordance with any particular embodiment. Thus, for example, those skilled in the art will recognize that the disclosed embodiments and techniques described herein may be embodied or carried out in a manner that achieves or optimizes one advantage or group of advantages as taught herein without necessarily achieving other objects or advantages as may be taught or suggested herein.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wind turbine blade assembly, the blade assembly comprising:
   a rotor blade having exterior surfaces defining a pressure side, a suction side, a leading edge and a trailing edge, the pressure side, the suction side, the leading edge and the trailing edge extending between a blade tip and a blade root, the rotor blade defining a span and a chord; and
   a plurality of micro boundary layer energizers comprising at least one of vanes, grooves, dents, dimples, wall segments and wheeler-type vortex generators positioned on a surface of the pressure side of the rotor blade in an outboard area of the rotor between 0%-50% of a spanwise dimension measured from the blade tip, exclusive of an inboard portion of the blade, downstream a distance from a stagnation region, and upstream of a separation bubble when present, to affect pressure side flow in a normal operating range, the plurality of micro boundary layer energizers extending one of above or below a neutral plane of the rotor blade,
   wherein x/c is the ratio of a distance of an upstream most point of each of the micro boundary layer energizers from the leading edge along a chord axis "x" to a total length "c" of the chord and wherein x/c is between ~20-55% for each micro boundary layer energizer of the plurality of micro boundary layer energizers, and wherein the pressure side of the rotor blade is exclusive of additional micro boundary layer energizers positioned downstream from an onset of the separation bubble, and
   wherein the plurality of micro boundary layer energizers are shaped and positioned chordwise to add longitudinal vortices oriented chordwise and delay separation of a boundary layer on the pressure side at a low angle of attack.

2. The wind turbine blade assembly as claimed in claim 1, wherein the longitudinal vortices increase a vertical momentum exchange in the boundary layer.

3. The wind turbine blade assembly as claimed in claim 1, wherein the plurality of micro boundary layer energizers are positioned upstream of a turbulent boundary layer separation.

4. The wind turbine blade assembly as claimed in claim 1, wherein the plurality of micro boundary layer energizers are positioned downstream of a point of minimum pressure ($C_P$-min).

5. The wind turbine blade assembly as claimed in claim 1, wherein the plurality of micro boundary layer energizers are positioned upstream of a point of minimum pressure ($C_P$-min).

6. The wind turbine blade assembly as claimed in claim 1, wherein each of the plurality of micro boundary layer energizers is wedge-shaped, defining a wind face, a plurality of side faces and a slip joint and, wherein the wind face and the plurality of side faces meet downstream at an apex.

7. The wind turbine blade assembly as claimed in claim 1, wherein each of the plurality of micro boundary layer energizers defines a wedge ramp having an apex height "h" above the neutral plane and a length "L" along the neutral plane, wherein a ratio of h to L is between 1:5 to 1:20, wherein δ is equal to a thickness of the boundary layer, determined at an AoA (angle of attack)/condition when a turbulent separation bubble SB has begun to form, and wherein a relative height h/δ(delta) is between 0.2 and 0.7.

8. The wind turbine blade assembly as claimed in claim 1, wherein the plurality of micro boundary layer energizers are spaced in a spanwise direction, having a spacing "S" between adjacent energizers in a range of approximately 8-20 times a height "h" of the plurality of micro boundary layer energizers.

9. The wind turbine blade assembly as claimed in claim 1, wherein a spanwise spacing between adjacent micro boundary layer energizers of the plurality of micro boundary layer energizers is between 300 mm measured from a downstream most point of each of the adjacent micro boundary layer energizers.

10. The wind turbine blade assembly as claimed in claim 1, wherein a height "h" of each of the plurality of micro boundary layer energizers extends between 1-15 mm above the neutral plane of the rotor blade.

11. The wind turbine blade assembly as claimed in claim 1, wherein each of the plurality of micro boundary layer energizers includes a plurality of vane-type components configured as one of a co-rotating micro-boundary layer energizer or a counter-rotating micro boundary layer energizer.

12. The wind turbine blade assembly as claimed in claim 1, wherein each of the plurality of micro boundary layer energizers is a wheeler-type micro boundary layer energizer configured as, a wishbone-shaped micro boundary layer energizer or a doublet-shaped micro boundary layer energizer.

13. The wind turbine blade assembly as claimed in claim 1, wherein the plurality of micro boundary layer energizers are static and fixed relative to the rotor blade surface at an operational position extending one of above or below the neutral plane of the rotor blade.

14. The wind turbine blade assembly as claimed in claim 1, wherein the plurality of micro boundary layer energizers are dynamic and actuated from a retracted position to an operational position extending above the neutral plane of the rotor blade.

15. A wind turbine, the wind turbine comprising a plurality of rotor blade assemblies, at least one of the plurality of rotor blade assemblies comprising:
   a rotor blade comprising a suction side surface and a pressure side surface, and defining a span and a chord;
   a plurality of micro boundary layer energizers comprising at least one of vanes, grooves, dents, dimples, wall segments and wheeler-type vortex generators formed on the pressure side surface in an outboard area of the rotor between 0%-50% of a spanwise dimension measured from the blade tip, exclusive to an inboard portion of the blade, downstream a distance from a stagnation region, and upstream of a separation bubble when present, to affect pressure side flow in a normal operating range, the plurality of micro boundary layer energizers extending one of above or below a neutral plane of the rotor blade in an operational position of the plurality of micro boundary layer energizers,
   wherein x/c is the ratio of a distance of an upstream most point of each of the micro boundary layer energizers from the leading edge along a chord axis "x" to a total length "c" of the chord and wherein x/c is between ~20-55% for each micro boundary layer energizer, and wherein the pressure side of the rotor blade is exclusive of additional micro boundary layer energizers positioned downstream from an onset of the separation bubble, and wherein the plurality of micro boundary layer energizers are shaped and positioned to add chordwise oriented longitudinal vortices into a boundary layer to increase vertical momentum exchange in the boundary layer and delay separation of the boundary layer at a low angle of attack.

16. The wind turbine as claimed in claim 15, wherein the plurality of micro boundary layer energizers are positioned downstream of a point of minimum pressure ($C_P$-min).

17. The wind turbine as claimed in claim 15, wherein the plurality of micro boundary layer energizers comprise wedge-shaped elements extending one of above or below a neutral plane of the rotor blade and wherein an apex of each of the wedge-shaped elements is directed toward a trailing edge of the rotor blade.

18. The wind turbine as claimed in claim 15, wherein the plurality of micro boundary layer energizers are one of,
dynamic and actuated from a retracted position to the operational extending above the neutral plane of the pressure side of the rotor blade, and
static, fixedly positioned relative to the rotor blade at the operational position extending one of above or below the neutral plane of the pressure side of the rotor blade.

19. A wind turbine comprising:
a tower;
a hub;
at least one rotor blade assembly rotatably connected to the hub, the at least one rotor blade assembly rotatable in response to wind impinging upon the at least one rotor blade assembly, the rotor blade assembly comprising:

a rotor blade having exterior surfaces defining a pressure side, a suction side, a leading edge and a trailing edge, each of the pressure side, the suction side, the leading edge and the trailing edge extending between a blade tip and a root, the rotor blade defining a span and a chord; and a plurality of micro boundary layer energizers comprising at least one of vanes, grooves, dents, dimples, wall segments and wheeler-type vortex generators positioned on a surface of the pressure side of the rotor blade in an outboard area of the rotor between 0%-50% of a spanwise dimension measured from the blade tip, exclusive to an inboard portion of the blade, downstream a distance from a stagnation region, and upstream of a separation bubble when present, to affect pressure side flow in a normal operating range, the plurality of micro boundary layer energizers extending one of above or below a neutral plane of the rotor blade, x/c is the ratio of a distance of an upstream most point of each of the micro boundary layer energizers from the leading edge along a chord axis "x" to a total length "c" of the chord and wherein x/c is between ~20-55% for each micro boundary layer energizer, and wherein the pressure side of the rotor blade is exclusive of additional micro boundary layer energizers positioned downstream from an onset of the separation bubble, and wherein the plurality of micro boundary layer energizers are shaped and positioned chordwise to add longitudinal vortices oriented chordwise and delay separation of a boundary layer at a low angle of attack.

* * * * *